United States Patent [19]

Dederer et al.

[11] Patent Number: 5,733,675
[45] Date of Patent: Mar. 31, 1998

[54] ELECTROCHEMICAL FUEL CELL GENERATOR HAVING AN INTERNAL AND LEAK TIGHT HYDROCARBON FUEL REFORMER

[75] Inventors: Jeffrey T. Dederer, Valencia; Charles A. Hager, Mars, both of Pa.

[73] Assignee: Westinghouse Electric Corporation, Pittsburgh, Pa.

[21] Appl. No.: 518,272

[22] Filed: Aug. 23, 1995

[51] Int. Cl.[6] ............................ H01M 8/18; H01M 8/10
[52] U.S. Cl. ........................ 429/19; 429/20; 429/30; 429/31; 429/32
[58] Field of Search ........................ 429/19, 20, 30, 429/31, 32

[56] References Cited

U.S. PATENT DOCUMENTS

| | | | |
|---|---|---|---|
| Re. 28,792 | 4/1976 | Ruka et al. | 204/1 T |
| 4,128,700 | 12/1978 | Sederquist | 429/17 |
| 4,374,184 | 2/1983 | Somers et al. | 429/17 |
| 4,395,468 | 7/1983 | Isenberg | 429/31 |
| 4,448,858 | 5/1984 | Graf et al. | 429/49 |
| 4,490,444 | 12/1984 | Isenberg | 429/31 |
| 4,684,581 | 8/1987 | Struthers | 429/19 |
| 4,729,931 | 3/1988 | Grimble | 429/17 |
| 4,751,152 | 6/1988 | Zymboly | 429/31 |
| 4,808,491 | 2/1989 | Reichner | 429/13 |
| 4,810,485 | 3/1989 | Marianowski et al. | 423/648.1 |
| 4,876,163 | 10/1989 | Reichner | 429/30 |
| 4,877,693 | 10/1989 | Baker | 429/19 |
| 4,898,792 | 2/1990 | Singh et al. | 429/19 |
| 4,933,242 | 6/1990 | Koga et al. | 429/19 |
| 4,983,471 | 1/1991 | Reichner et al. | 429/19 |
| 5,047,299 | 9/1991 | Shockling | 429/20 |
| 5,077,148 | 12/1991 | Schora et al. | 429/16 |
| 5,082,751 | 1/1992 | Reichner | 429/19 |
| 5,100,743 | 3/1992 | Narita et al. | 429/19 |
| 5,143,800 | 9/1992 | George et al. | 429/20 |
| 5,169,730 | 12/1992 | Reichner et al. | 429/20 |
| 5,175,062 | 12/1992 | Farooque et al. | 429/20 |
| 5,212,022 | 5/1993 | Takahashi et al. | 429/19 |
| 5,366,819 | 11/1994 | Hartvigsen et al. | 429/17 |

OTHER PUBLICATIONS

Grant, Julius ed. *Hackh's Chemical Dictionary*, 1969, p. 342.

*Primary Examiner*—Kathryn L. Gorgos
*Assistant Examiner*—Chrisman D. Carroll

[57] ABSTRACT

An electrochemical fuel cell generator configuration is made having a generator section which contains a plurality of axially elongated fuel cells, each cell containing a fuel electrode, air electrode, and solid oxide electrolyte between the electrodes, in which axially elongated dividers separate portions of the fuel cells from each other, and where at least one divider also reforms a reformable fuel gas mixture prior to electricity generation reactions, the at least one reformer-divider is hollow having a closed end and an open end entrance for a reformable fuel mixture to pass to the closed end of the divider and then reverse flow and pass back along the hollowed walls to be reformed, and then finally to pass as reformed fuel out of the open end of the divider to contact the fuel cells, and further where the reformer-divider is a composite structure having a gas diffusion barrier of metallic foil surrounding the external walls of the reformer-divider except at the entrance to prevent diffusion of the reformable gas mixture through the divider, and further housed in an outer insulating jacket except at the entrance to prevent short-circuiting of the fuel cells by the gas diffusion barrier.

17 Claims, 6 Drawing Sheets

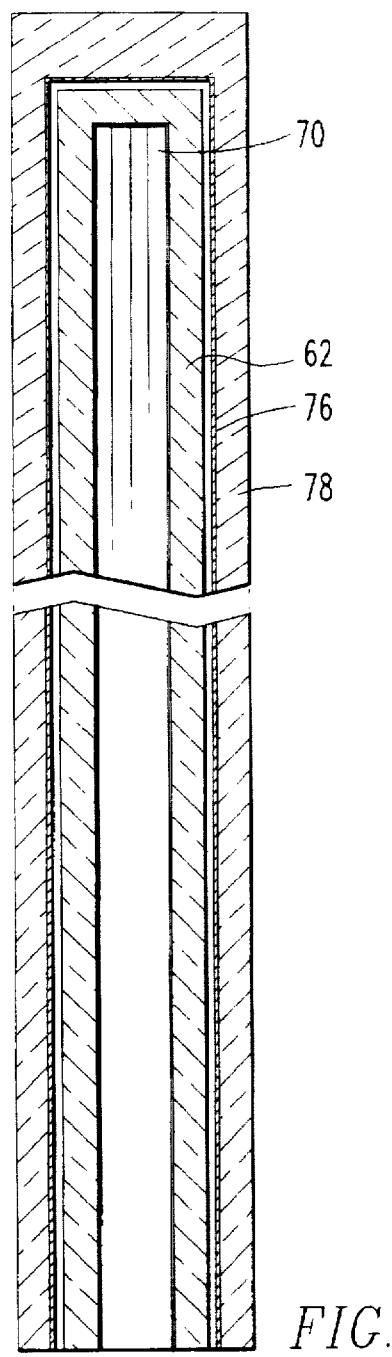
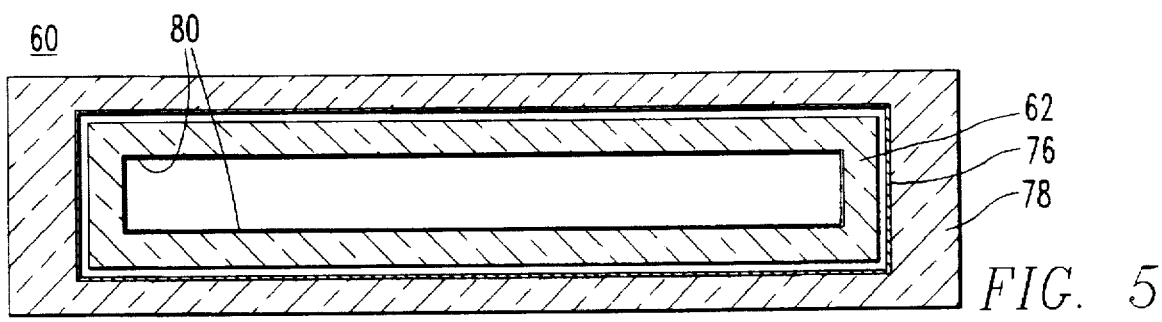
FIG. 6
FIG. 5

ELECTROCHEMICAL FUEL CELL GENERATOR HAVING AN INTERNAL AND LEAK TIGHT HYDROCARBON FUEL REFORMER

1. GOVERNMENT CONTRACT

The Government of the United States of America has rights in this invention pursuant to Contract No. DE-FC21-91MC28055, awarded by the United States Department of Energy.

2. FIELD OF THE INVENTION

The invention relates to the field of electrochemical generators and configurations thereof comprised of solid electrolyte fuel cells which generate electricity from air and fuel gas for electrical power stations. The invention more particularly relates to the field of high temperature, solid oxide electrolyte fuel cell generators and configurations thereof containing internal hydrocarbon fuel gas reformers which precondition hydrocarbon feed fuels prior to electrochemically processing in the fuel cell stack of the generator. Even more particularly, the invention relates to the field of internal hydrocarbon reformers and improved configurations thereof which are used inside the fuel cell stack of high temperature, solid oxide electrolyte fuel cell generators and which perform a dual function as a hydrocarbon reformer and fuel cell stack divider. The invention especially provides a combination internal hydrocarbon fuel reformer and fuel cell stack divider configuration with a gas barrier to reduce fuel gas leakage therethrough and enhance structural integrity thereof.

3. BACKGROUND OF THE INVENTION

High temperature, solid oxide electrolyte fuel cells and multi-cell generators and configurations thereof are well known, and taught, for example, in U.S. Pat. Nos. 4,395,468 (Isenberg) and 4,490,444 (Isenberg). The solid oxide fuel cell generator is designed to convert chemical fuel derived from hydrocarbons into direct current (DC) electricity. The solid oxide fuel cell generator is conventionally operated at temperatures between about 600° C. and 1,200° C., more particularly about 800° C. to 1,050° C., to render the solid oxide electrolyte sufficiently electrically conductive for electrochemical reactions which generate electricity.

In such multi-cell generators, a plurality of electrically connected tubular solid oxide fuel cells are placed in a generator chamber defined by an alumina board housing, otherwise known as a fuel cell stack, and are exposed to a supply of gaseous oxidant and reformed gaseous hydrocarbon feed fuel. In larger multi-cell generators, divider boards of insulation material such as alumina boards are placed between either individual fuel cells or a plurality of fuel cells, otherwise known as cell bundles, for thermal and electrical insulation, and also for internal structural support of the generator, as taught in U.S. Pat. Nos. 4,876,163 (Reichner) and 4,808,491 (Reichner). The divider boards are typically used to separate rows of cell bundles, which cell bundles typically contain from 12 to 36 fuel cells.

Multi-cell generators feature a plurality of parallel, elongated tubular solid oxide fuel cells arranged in cell bundles. Each tubular solid oxide fuel cell is made of an inner porous air electrode of, for example, strontium-doped lanthanum manganite. A dense, gas-tight solid oxide electrolyte of, for example, yttria stabilized zirconia covers the air electrode, except in a strip along the entire active cell length. This strip of exposed length is covered by an interconnect of dense, gas-tight layer of, for example, magnesium-doped lanthanum chromite which serves as the electric contacting area to an adjacent fuel cell or to a power contact. A porous fuel electrode of, for example, nickel-zirconia cermet covers the solid oxide electrolyte except in the vicinity of the interconnect. Spent fuel is combusted with spent oxidant in a separate combustion chamber and exits the generator as hot exhaust gas.

In these high temperature, solid oxide multi-cell generators, air and fuel are combined to form heat and electricity through electrochemical reactions. The fuel can be derived from fossil fuels such as coal derived fuel gas, natural gas, or distillate fuel. Each solid oxide fuel cell readily conducts oxygen ions from the air electrode (cathode) of the fuel cell in contact with the air, where the oxygen ions are formed, through the solid oxide electrolyte of the fuel cell between the air electrode and fuel electrode to the fuel electrode (anode). The oxygen ions then react with carbon monoxide (CO) and/or hydrogen ($H_2$) derived from a reformed hydrocarbon fuel gas to deliver electrons and produce electricity.

However, the direct use of hydrocarbon fuels as a fuel to the fuel cells of the generator, such as methane, ethane, mixtures of hydrocarbons such as natural gas (mostly methane plus ethane, propane, butane, and nitrogen), vaporized petroleum distillates such as naphtha, or alcohols such as ethyl alcohol, is undesirable. These hydrocarbons form undesirable carbon deposits and soot on the fuel cells and other components of the generator if used directly as the fuel gas. This can reduce the efficiency of the fuel cells and can interfere with proper generator operations. For instance, carbon deposition on the fuel cells may block gas transport paths in the porous electrodes and provide electrical short-circuit paths between the electrodes. Carbon deposition on other generator components such as insulation materials may reduce insulation effectiveness and provide electrical short-circuit paths between fuel cell bundles through separating insulation.

Accordingly, the fuels that have been supplied in the fuel cell generator generally have been limited to carbon monoxide (CO) and hydrogen ($H_2$). The carbon monoxide and hydrogen fuels can be obtained by reforming hydrocarbon fuel gases. Reforming is a process in which the reformable hydrocarbon fuel is combined with water vapor and/or carbon dioxide to produce carbon monoxide and hydrogen. For example, the reforming of methane using water and carbon dioxide is given by Equations (1) and (2).

$$CH_4 + H_2O \rightarrow CO + 3H_2 \qquad (1)$$

$$CH_4 + CO_2 \rightarrow 2CO + 2H_2 \qquad (2)$$

Therefore, in order to efficiently use the hydrocarbon fuels without the detrimental effects in the fuel cell generator, fresh hydrocarbon feed fuel gases are combined with water vapor and/or carbon dioxide, typically obtained from recirculated spent fuel gas, to form a reformable fuel mixture. This reformable fuel mixture is then reformed, that is, converted to carbon monoxide and hydrogen, through the use of a reforming catalyst, usually platinum or nickel compounds and usually supported on alumina in the form of pellets or boards. The reformed fuel is then used as the fuel gas to the solid oxide fuel cells in the fuel cell stack of the generator.

Since hydrocarbon reforming is endothermic (i.e., requires a supply of heat), heat must be supplied to the reaction. Reforming hydrocarbon fuel outside of the fuel cell generator is undesirable as it results in a loss of energy as heat in the reformer and in connecting conduits between the generator and the reformer, makes the generator system more complicated (i.e., requires heat exchangers, pumps, and more space) and is more expensive overall. U.S. Pat. No. 4,128,700 illustrates reforming of fuel outside of the fuel cell generator. Attempts have been made to reform hydrocarbon fuel inside the generator which is desirable, especially since reforming is best performed at temperatures of about 900° C. to 1,000° C. which is close to that of the solid oxide fuel cell operation of generally about 600° C. to 1,200° C. and more particularly about 800° C. to 1,050° C.

In U.S. Pat. No. 4,374,184 (Somers, et al.), an attempt to solve this problem was made by internal reforming on a deliberately constructed inactive end of each tubular fuel cell. This process relieved, somewhat, the excessive thermal gradients in the fuel cell stack. This, however, cut down dramatically on active fuel cell area within the fuel cell stack. In U.S. Pat. No. 4,729,931 (Grimble), internal reforming is done using a catalytic packing such as finely divided nickel or platinum for reformation of hydrocarbon fuels, which is placed in a catalyst chamber adjacent to the fuel cell generator chamber and external to the fuel cell stack. In this arrangement, a hydrocarbon fuel gas is fed into a nozzle and is mixed with recirculated spent fuel gas containing water vapor and carbon dioxide, and this reformable gas mixture is drawn along side the generator chamber in heat transfer communication therewith into the catalytic packing where it is reformed, and then the reformed gas is passed into the fuel plenum to the fuel cells in the generator chamber. In U.S. Pat. No. 4,808,491 (Reichner), internal reforming is done using the hot exhaust gas of the generator as the heat source for reforming, which exhaust gas is passed in heat transfer communication with a reformer catalyst bed external to the fuel cell stack but directly underneath the closed ends of the fuel cells.

With the methods described previously for internal reforming, it is still difficult to transfer heat necessary for the endothermic reforming reaction without the creation of excessive temperature gradients within the fuel cell stack and in the reformer. Air flow to the fuel cells consequently must be increased beyond that required for electrochemical reaction with the fuel, to prevent excessive temperature gradients. One attempt to solve this heat transfer problem is in U.S. Pat. No. 4,983,471 (Reichner, et al.) in which a reformable fuel mixture channel is passed through the axial length of the fuel cell stack. A reformable fuel mixture of combined recirculated hot spent fuel gas and fresh hydrocarbon fuel to be reformed is passed in the channel and through entry ports into the fuel cell stack along the length of the fuel cells with an axis transverse to the fuel cells. In the fuel cell stack, the reformable mixture contacts a reforming material which is distributed along the length of the fuel cells within the fuel cell stack, such that the mixture can pass transversely through the reforming material such as nickel impregnated on porous partition boards prior to contacting the fuel cells.

Another attempt to solve this problem is in U.S. Pat. No. 5,082,751 (Reichner), in which internal reforming in the solid oxide fuel cell generator is performed on individual fuel cell reformer-dividers or cell bundle reformer-dividers within the fuel cell stack. In this design, the axially elongated tubular fuel cells or cell bundles in the fuel cell stack are separated by elongated dividers which can be made of porous alumina insulation material, such as alumina boards, which are coated or impregnated with reforming catalyst. The reformer-divider boards serve a dual purpose of separating individual fuel cells or cell bundles for internal structural support and reforming reformable hydrocarbon fuel mixtures in order to be fed as a fuel to the solid oxide fuel cells of the generator. In Reichner '751, the reformer-dividers are elongated and positioned between the fuel cell bundles, to separate and form a wall between the cell bundles. The reformer-dividers are further hollowed along a selected portion of their length and impregnated with reforming catalyst, to form a reforming channel therein having solid elongated partition walls exposed to the cell bundles. A reformable fuel mixture inlet into the reforming channel is provided as well as a reformed fuel gas exit, to allow passage of reformed fuel to the fuel inlet plenum beneath the solid oxide fuel cells. In this internal reformer configuration, reformer heat consumption is distributed along the axial length of the fuel cells at multiple locations between fuel bundles. Thus, the area for heat exchange is greatly increased and the excess heat to be removed by excess air flow is significantly reduced. This configuration also uses space which is already present between the fuel cells and does not reduce the active area of the fuel cells.

In operation of the Reichner '751 configuration, unreformed hydrocarbon fuel leakage occurs through the reformer-divider boards into the fuel cell stack. This remains a substantial problem to the efficiency of this internal reformer-divider configuration. Leakage is due to the fact that these reformer-divider boards are fabricated from porous (low density) alumina insulation materials. Leakage of unreformed fuel into the fuel cell stack can result in carbon deposition on the fuel cells and other generator components which is undesirable. Unsuccessful attempts have been made to prevent unreformed fuel leakage through the porous alumina board material by densifying or plasma spraying a brittle ceramic coating on the exterior surface of the boards to prevent leakage. This, however, does not significantly cut down the leakage because of cracking of the external coating as well as the alumina boards. Cracking occurs as a result of thermal stresses arising from large temperature gradients on the face of boards, and by bowing caused from temperature gradients through the board.

What is needed is an internal hydrocarbon reformer for a high temperature, solid oxide fuel cell generator which performs both hydrocarbon fuel reforming within the fuel cell stack of the generator and separation of the fuel cells or cell bundles for support but without unreformed fuel leakage associated with prior designs.

The present invention provides better configurations for internal reformer-dividers within the fuel cell stack of an electrochemical fuel cell generator which serve the dual purpose of reformer for hydrocarbon feed fuels and separator for fuel cell stacks. In this invention, the inventors have solved the problems of, inter alia, hydrocarbon fuel leakage through the reformer-divider boards, structural integrity of the boards when subject to thermal expansion, and manufacturability of the boards.

4. SUMMARY OF THE INVENTION

It is an object of the invention to provide an electrochemical fuel cell generator apparatus with an internal hydrocarbon reformer-divider configuration inside the fuel cell stack which eliminates the problems associated with prior designs.

It is another object of the invention to provide an internal hydrocarbon reformer-divider configuration in an electrochemical fuel cell generator apparatus having a significant reduction in unreformed hydrocarbon fuel leakage through the reformer-divider boards to the fuel cells in the fuel cell stack of the generator.

It is yet another object of the invention to provide an internal hydrocarbon reformer-divider configuration inside the fuel cell stack of a high temperature, solid oxide electrolyte fuel cell generator, where the reformer-divider acts as a combination reformer for hydrocarbon fuel gas and separator for the individual fuel cells or cell bundles, and further where the reformer is provided with a gas barrier means to prevent unreformed fuel leakage into the fuel cell stack and without inhibiting thermal expansion due to temperature gradients between the fuel cell stack and reformer.

It is an advantage of the invention to significantly reduce unreformed fuel leakage from the reformer-divider configuration to the fuel cells.

It is another advantage of the invention to allow for thermal expansion within the reformer-divider configuration to improve structural integrity of the reformer-divider.

Accordingly, the invention resides in an electrochemical generator configuration, such as a high temperature, solid oxide electrolyte fuel cell generator configuration characterized by: a generator chamber containing a fuel cell assembly comprising one or more fuel cell bundles, each cell bundle containing a plurality of electrically connected, axially elongated fuel cells, each fuel cell containing an outer fuel electrode, an inner air electrode, and solid oxide electrolyte therebetween; a fresh gaseous feed hydrocarbon fuel inlet into the generator chamber for fuel to pass over the outside of the outer fuel electrode; a gaseous feed oxidant inlet into the generator chamber for oxidant to pass inside the inner air electrode; at least one gaseous spent fuel exit channel where the spent fuel containing water vapor and/or carbon dioxide from the generator chamber is mixed with the fresh hydrocarbon feed fuel inlet; a combustion chamber from the generator chamber for combustion of spent fuel and spent oxidant; and, at least one combusted gas exhaust channel from the combustion chamber; the generator further characterized by: having one or more elongated dividers that are axially positioned between the fuel cells or fuel cell bundles along the axial length of the fuel cells or cell bundles to provide partitions between cells and/or cell bundles; and the generator even further characterized by: including in at least one of the one or more elongated dividers, a hollow channel along a selected portion of its length, the hollowed elongated divider having solid elongated walls, a reformable fuel mixture inlet for passage of reformable fuel mixture to be reformed in the hollow channel, a reformed fuel exit for passage of reformed fuel to the fuel cells, and further containing a catalytic reforming material in the hollowed channel, the dividers also containing a means effective to prevent unreformed gas leakage of the reformable fuel mixture from the dividers to the fuel cells without inhibiting thermal expansion of the dividers.

More specifically, the invention resides in an internal reformer within the fuel cell stack of a high temperature, solid oxide fuel cell generator, the reformer characterized by having one or more reformer-divider boards passing through the axial length of the fuel cell stack and positioned in between one or more axially elongated fuel cell bundles or axially elongated fuel cells to separate the cell bundles or fuel cells, where the one or more reformer boards are hollowed and impregnated with catalytic reforming material in the hollowed area having solid exterior walls, a reformable fuel mixture inlet to the hollowed area and reformed fuel outlet from the hollowed area to the fuel cells, and also including a means effective to prevent unreformed gas leakage of the reformable fuel mixture through the exterior walls of the reformer-divider boards, characterized by surrounding the walls of the hollowed reformer boards except at the reformable fuel mixture inlet with a metallic foil layer of nickel foil, INCONEL (76% Ni, 15% Cr and 9% Fe) foil, or other suitable nickel based alloy foil, to provide a barrier against unreformed fuel gas diffusion to the fuel cells, and further surrounding the metallic foil layer except at the reformable fuel mixture inlet with a housing made from the same material as the reformer boards to prevent short circuit of the generator.

5. BREIF DESCRIPTION OF THE DRAWINGS

There are shown in the drawings certain exemplary embodiments of the invention as presently preferred. It should be understood that the invention is not limited to the embodiments disclosed, and is capable of variation within the spirit and scope of the appended claims. In the drawings, FIG. 1 is a side view in section of one embodiment of an electrochemical generator apparatus of the invention, showing two fuel cell bundles, each bundle containing a plurality of fuel cells, and further showing the bundles being separated by a reformer-divider board having a gas barrier substantially impervious to fuel leakage;

FIG. 5 is a top view of the reformer-divider board of FIG. 3 along line 5—5;

FIG. 6 is a side view in section of the reformer-divider board of FIG. 3 along line 6—6;

6. DETAILED DESDCRITION OF THE PREFERRED EMBODIMENTS OF THE INVENTION

Figure 1:
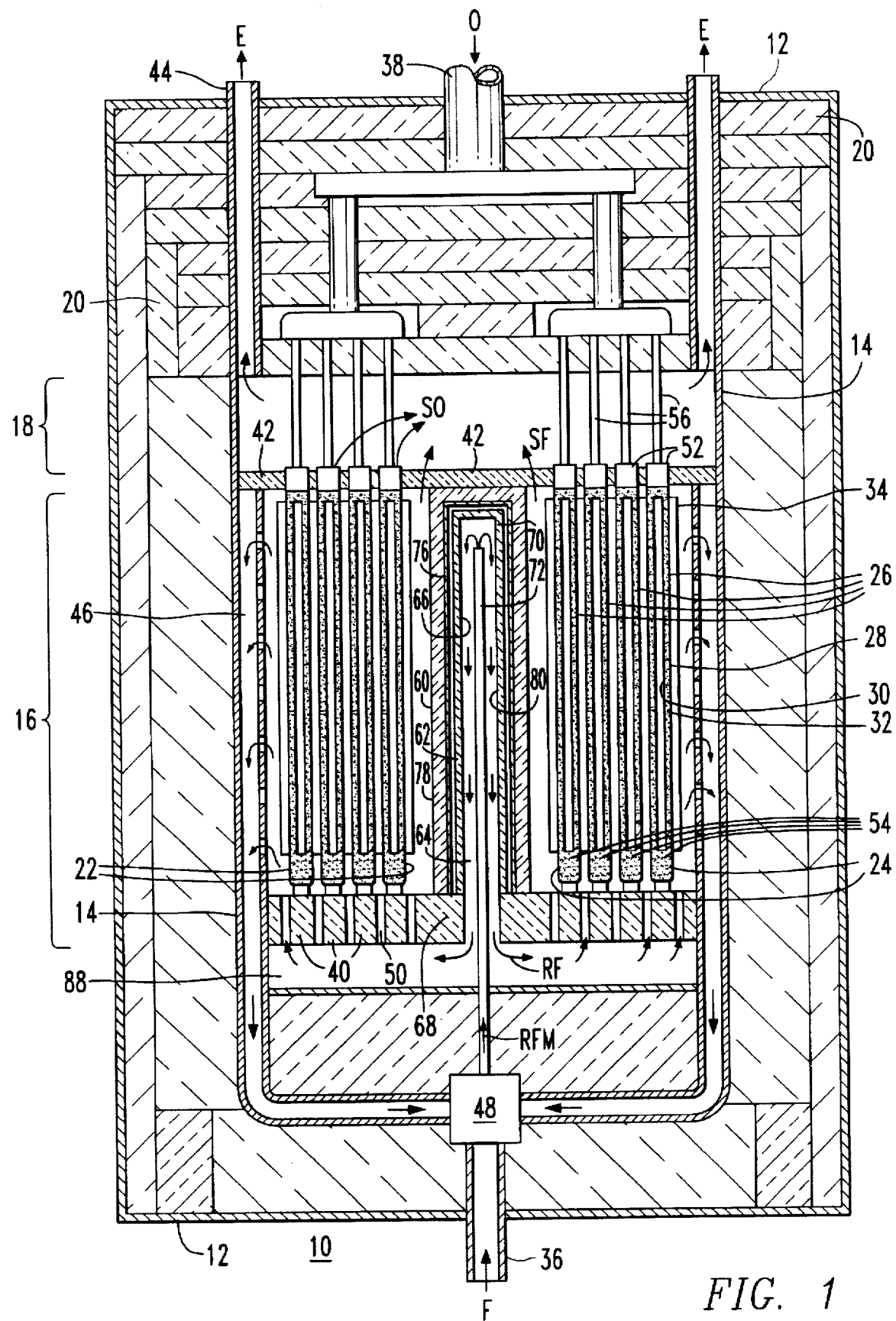

Referring now to FIG. 1, an exemplary electrochemical generator apparatus (10), for example, a high temperature, solid oxide electrolyte fuel cell (SOFC) generator, is shown. An outer housing (12) surrounds the entire electrochemical apparatus. The outer housing can be made of metal such as steel. An inner housing (14) surrounds a plurality of chambers including a generator chamber (16) and a combustion chamber (18). The inner housing (14) can be made of high temperature and oxidation resistant metal such as INCONEL or similar material. Thermal insulation (20) generally lines the inside of the outer housing (12) and also surrounds all of the chambers. The insulation (20) can be made of low density, alumina material, such as alumina felt or alumina insulation boards.

The generator chamber (16) (also referred to herein as the "fuel cell stack") contains one or more cell bundles, and, as shown, contains two cell bundles (22) and (24), each bundle containing a plurality of parallel, axially elongated, preferably tubular, electrochemical cells (26), for example, high temperature, solid oxide electrolyte fuel cells (SOFCs). Each fuel cell (26) contains an outer, porous fuel electrode (otherwise referred to herein as the "anode") (28) covering its axially elongated exterior surface, an inner, porous air electrode (otherwise referred to herein as the "cathode") (30) covering its axially elongated interior surface, and a dense, gastight solid oxide electrolyte (32) sandwiched between the fuel electrode (28) and the air electrode (30). The inner air electrode (30) can be a doped ceramic of the perovskite family, for example, strontium-doped lanthanum manganite ($LaMnO_3$), the solid oxide electrolyte (32) can be a dense, gas-tight yttria- or scandia-stabilized zirconia ($ZrO_2$), and the outer fuel electrode (28) can be a porous nickel-zirconia cermet.

The inner air electrode (30) can be supported on an optional porous ceramic support tube (not shown) of calcia-stabilized zirconia. Both the outer fuel electrode (28) and solid electrolyte (32) are typically discontinuous in a selected segment along the axial length of the inner air electrode (not shown) to allow for inclusion of an interconnect (not shown) on the air electrode (30) to provide means to electrically connect adjacent fuel cells (26). The interconnect can be a magnesium-doped lanthanum chromite ($LaCrO_3$) and can also include a top cover (not shown) of nickel-zirconia cermet. The electrical interconnection via the interconnect of adjacent fuel cells (26) is enhanced by a porous metal felt (34), for example, a nickel fiber felt, positioned along the active lengths of the fuel cells, preferably through direct contact of the outer surfaces.

In the drawings, each fuel cell (26) is shown as being tubular, but of course other configurations are possible, such as planar-shaped fuel cell configurations. It should also be recognized that the relative positioning of the air electrode (30) and fuel electrode (28) can be inverted as well, so long as the fuel electrode remains in contact with fuel and the air electrode remains in contact with air or oxygen.

Penetrating the outer housing (12) and thermal insulation (20) are ports for electrical leads (not shown) as well as ports for the electrochemical reactants of fuel and oxidant. A fresh hydrocarbon fuel reactant inlet port (36) is shown, the hydrocarbon feed fuel, being shown as (F), passing therein, which feed fuel (F) typically is unreformed natural gas comprising in most part methane. The hydrocarbon feed fuel (F) is directed to pass through a series of conduits for fuel conditioning such as in a reforming channel prior to passing over the outer fuel electrode as more fully described hereinbelow. Also shown is a fresh oxidant reactant inlet port (38), the oxidant, being shown as (O), passing therein, which oxidant (O) typically is air or oxygen. The oxidant (O) is directed to pass through a series of conduits prior to passing over the interior air electrode as more fully described hereinbelow.

The generator chamber (16) extends between a fuel distribution plate (40) and a porous barrier (42). The porous barrier (42) is designed to allow partially reacted or spent fuel gas, being shown as (SF), to exit the generator chamber (16) after passing over the exterior of the fuel cells for combustion with partially reacted or spent oxidant, being shown as (SO), after passing through the interior of the fuel cells in the combustion chamber (18), to form hot combusted exhaust gas, being shown as (E), which passes through a combusted exhaust channel (44) and into the atmosphere. The combusted exhaust channel can be made of high temperature and oxidation resistant metal such as INCONEL. A portion of the spent fuel (SF) containing water vapor and/or carbon dioxide not being directed into the combustion chamber (18), can be directed in a spent fuel recirculation channel (46), to combine with fresh hydrocarbon feed fuel (F) at a mixing chamber (48) to form a reformable fuel mixture (RFM) in order to supply the oxygen species needed for fuel reformation reactions and to facilitate hydrocarbon reforming of the unreformed feed fuel (F). The spent fuel recirculation channel can be made of high temperature and oxidation resistant metal such as INCONEL. Spaced between the fuel distribution plate (40) are generator chamber entry ports (50) for entry of reformed fuel gas into the fuel cell stack (16) to the fuel electrode (28) of the fuel cells (26).

The elongated, preferably tubular, fuel cells (26) extend in the generator chamber between the fuel distribution plate (40) and the porous barrier (42). Each fuel cell (26) has an open end (52) in the combustion chamber (18) and a closed end (54) in the generator chamber (16) near the fuel distribution plate (40). The open ends (52) of the fuel cells (26) contain oxidant feed conduits (56), such as oxidant riser tubes positioned therein.

In such a fuel cell generator arrangement (10), the inventors have discovered a new way to reform the fresh gaseous hydrocarbon feed fuel (F) prior to contacting the fuel electrode (28) of the fuel cells (26) to reformed fuel (RF) inside the fuel cell stack (16) using improved reformer-separator (also referred to herein as "reformer-divider") configurations without appreciable unreformed fuel (F) leakage into the fuel cell stack prior to fuel reformation. The reformer-dividers of the invention are used to both divide and support the fuel cells (26) or cell bundles (22, 24) within the fuel cell stack (16), and also support other generator components, while also substantially eliminating undesirable unreformed fuel gas (F) leakage into the fuel cell stack (16) to contact the fuel cells (26) due to porosity of the reformer-divider boards. The reformer-divider configurations also substantially eliminate undesirable structural degradation of the reformer-divider due to thermal expansion of the boards.

In one arrangement of the invention, a plurality of axially elongated, preferably tubular, fuel cells (26), forming cell bundles (22) and (24), are separated by elongated dividers (60) extending between the porous barrier (42) and the fuel distribution board (40) and which are used to divide the fuel cell stack (16). These dividers (58) can be made of solid pieces of porous alumina boards of suitable thickness and are positioned within the fuel cell stack (16) to separate the stack and provide internal structural integrity to the generator. In the present invention, at least one other divider will be a dual purpose reformer-divider (60) as shown.

The reformer-divider (60) is positioned within the fuel cell stack between individual fuel cells (26) or cell bundles (22) and (24), extending between the porous barrier (42) and fuel distribution plate (40), to provide a means for reforming the fresh hydrocarbon feed fuel (F) to reformed fuel (RF) prior to passing over the outer fuel electrodes (28) of the fuel cells (26). The reformer-divider (60) can be made of a porous alumina board. The reformer-divider (60), unlike conventional reformer-dividers located within the fuel cell stack, as taught in U.S. Pat. No. 5,082,751 (Reichner), also contains an effective means to prevent unreformed fuel gas (F) from leaking through the external walls of the porous alumina boards and thereby passing over the outer fuel electrodes (28) prior to being reformed to reformed fuel (RF). A gas diffusion barrier means as more fully described hereinbelow is provided in the reformer-divider boards (60) to eliminate gas leakage due to diffusion and is also arranged therein to eliminate structural degradation of the reformer-divider boards (60) due to thermal expansion.

Figure 2:
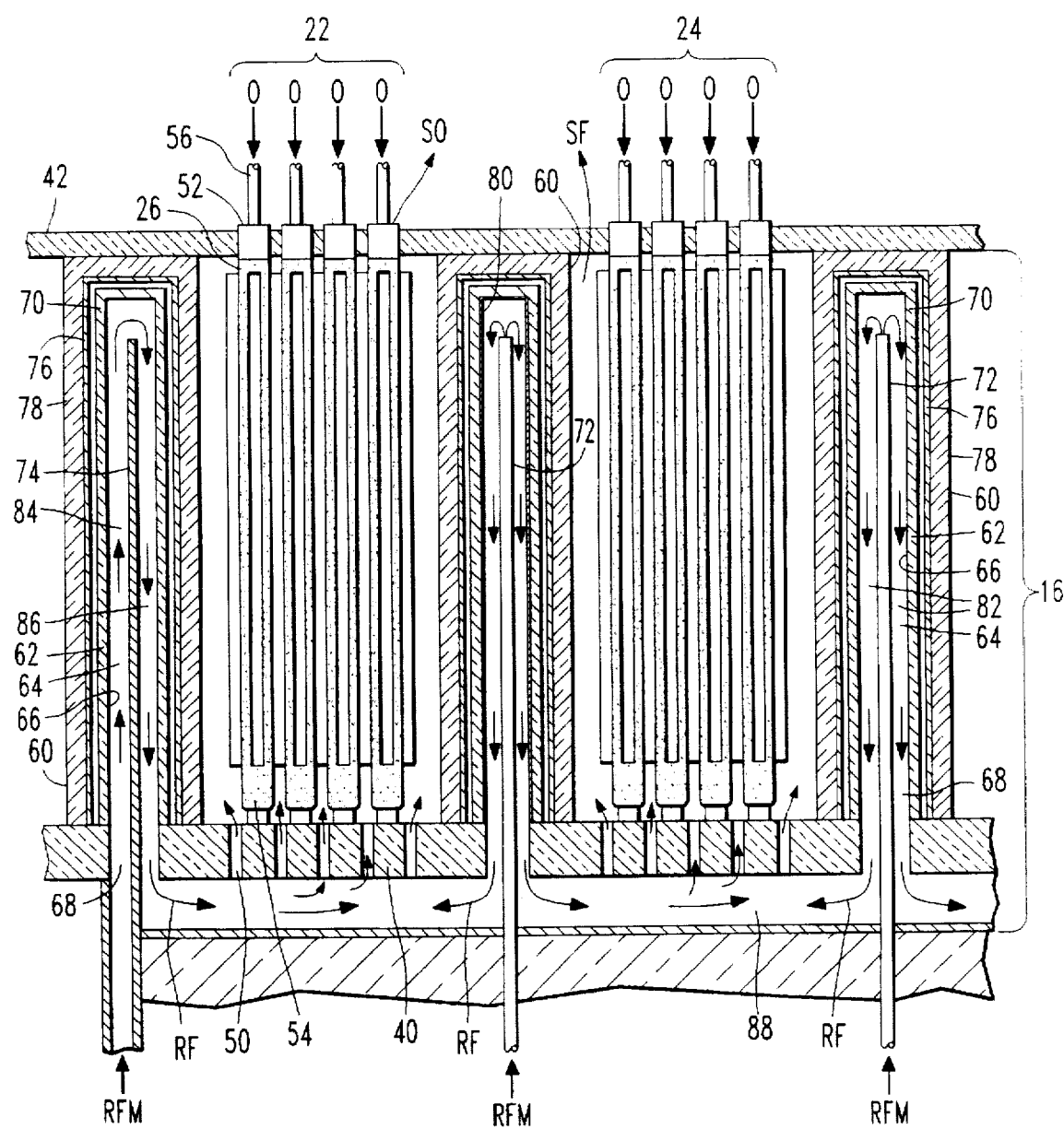
FIG. 2 is a enlarged side view in section of a portion of an electrochemical generator apparatus of the invention, showing two fuel cell bundles, each bundle containing a plurality of fuel cells, and further showing the bundles being separated by a reformer-divider board having a gas barrier impervious to fuel leakage.
Figure 3:
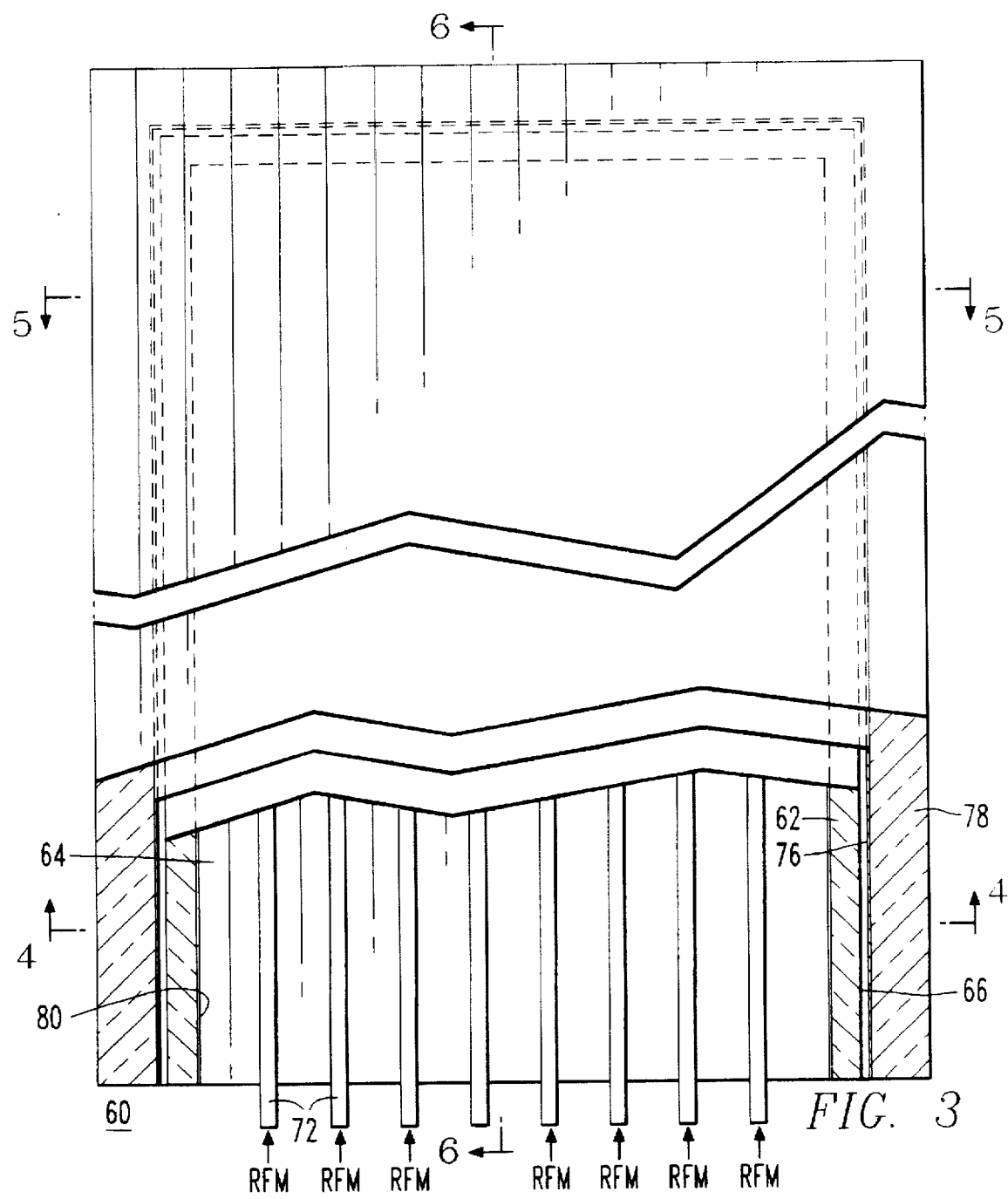
FIG. 3 is a side view of an internal reformer-divider board of the invention positionable within the fuel cell stack between fuel cells or cell bundles and having a gas barrier cutaway at a portion to show the multi-part configuration thereof.
Figure 4:
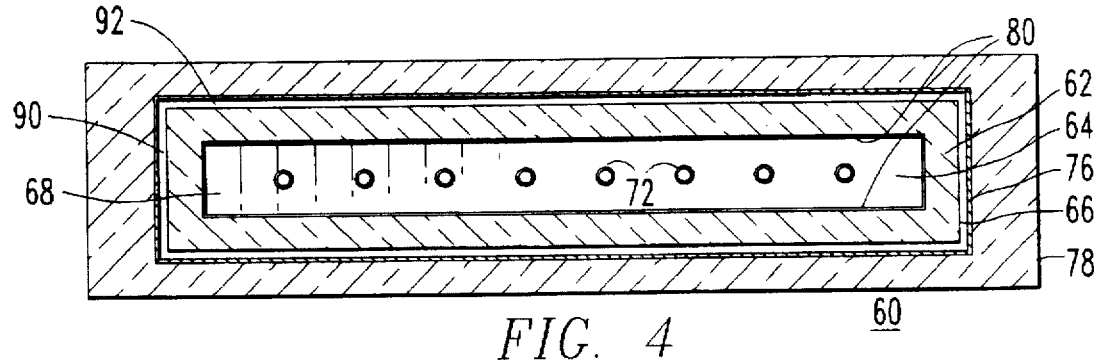
FIG. 4 is a bottom view of the reformer-divider board of FIG. 3 along line 4—4.

Referring now to FIG. 2, each of the reformer-dividers (60) include an inner board (62) having a hollowed inner channel (64) surrounded by solid elongated walls (66), the inner channel having an opened end or entrance (68) for the gaseous reformable fuel mixture (RFM) (e.g., natural gas combined with spent fuel) near the closed ends (54) of the fuel cells (26) and a closed end (70) near the opened ends (52) of the fuel cells (26). The inner channel (64) can, for example, be formed by tubes (72) or by a partition (74), both of which will allow the reformable fuel mixture (RFM) to pass inside the reformer-divider (60) to the closed top end (70) of the reformer-divider (60) and then back to exit through the bottom opened end (68) as reformed fuel (RF) to the fuel cells (26) in the fuel cell stack (16), via a fuel distribution plenum (88) and fuel ports (50) near the closed ends (54) of the fuel cells (26). The reformer-divider (60) of the invention also includes a gas barrier (76) means substantially surrounding the solid elongated walls (66) except at the opened entrance (68) and an outer board housing (78) substantially surrounding the reformer-divider (60) and gas barrier (76) assembly except at the opened entrance (68).

As shown in the drawing, when tubes (72) are used the reformable fuel mixture (RFM) passes from entrance (68), through the inside of the riser tube (72), to the top of the tube where the reformable fuel mixture exits near the closed end (70), reverses flow, and passes back down the reformer-divider (60) to exit as reformed fuel (RF) at entrance (68). When a single partition (74) is used, the reformable fuel mixture (RFM) passes from entrance (68), along one side of the partition, in the channel formed by the partition and the divider walls, to the top of the partition, over the top of the partition, where the reformable fuel mixture (RFM) reverses flow and passes back down the reformer-divider (60) in the channel formed by the partition and the other divider wall.

Catalytic reforming material will be disposed either within the cross-section of the reformer-divider (60), for example, as a coating on or within the inner side walls (80) of the hollow reformer-divider, or as a packing within the chamber area (82) between reformable fuel riser tube and the side walls of the reformer-divider; or in the feed side (84) and/or return side (86) formed by partition (74), that is, on one side or both sides of partition. The catalytic reforming material will (80, 82, 84 or 86) contain a catalyst effective to reform hydrocarbon feed fuel (F), and if used as a bed in portions (82, 84, or 86) it should not be packed so tightly as to excessively restrict gas flow. The reforming material will preferably contain at least one of platinum and nickel, and will most preferably contain nickel. The reforming material can be in the form of a film, a coating, metal fibers, high surface area pellets or particles by themselves or with alumina filaments, as a coating on alumina filaments, and the like, and can also contain effective amounts of additives that will help to control carbon deposition.

This reforming is a process in which the reformable hydrocarbon fuel (F) is combined with water vapor (steam) and/or carbon dioxide, preferably from the spent fuel (SF), to provide a reformable fuel mixture (RFM) which when contacted with catalytic reforming material as to the hydrocarbon fuel, will produce carbon monoxide (CO) and hydrogen ($H_2$) in a heat environment, preferably about 900° C. For example, the reforming of methane and ethane (natural gas) is given by Equations (1)–(4):

$$CH_4 + H_2O \rightarrow CO + 3H_2 \quad (1)$$

$$CH_4 + CO_2 \rightarrow 2CO + 2H_2 \quad (2)$$

$$C_2H_6 + 2H_2O \rightarrow 2CO + 5H_2 \quad (3)$$

$$C_2H_6 + 2CO_2 \rightarrow 4CO + 3H_2 \quad (4)$$

Excess water is generally provided in the reformable fuel mixture (RFM) to reduce the tendency for carbon deposition. After reformation, the reformed fuel (RF) passes outside of the reformer-divider (60) to contact the fuel cells (26), as through distribution plenum (88) fuel stack entry ports (50) formed through the fuel distribution plate (40) near the bottom closed end (54) of the fuel cells (26).

In a preferred example, the channels will be a series of hollow ceramic or high temperature-resistant metal (such as INCONEL) tubes (72) within hollowed out alumina partition boards, and particles of nickel acting as reforming catalyst will be contained within the chamber area between the tubes and the inside alumina board walls.

Reformed fuel (RF) enters the generator chamber (16) through the ports (50) near the closed end (54) of the fuel cells (26) and flows over the periphery of the cells contacting the fuel electrodes (28). The reformed fuel (RF) electrochemically reacts with the oxidant (O), e.g., air, passing through the solid electrolyte (32) from the air electrode (30), and reaches the porous barrier (42) in depleted form as spent fuel (SF). The hot, depleted or spent fuel (SF) passes through the barrier (42), into the preheating combustion chamber (18), where it reacts directly with the oxygen depleted air or spent oxidant (SO) returning from the inside of the fuel cells. The sensible heat in the depleted fuel and air, as well as the heat of the reaction, are utilized to preheat the entering oxidant. The products of the direct fuel-air interaction are then discharged from the preheating chamber, and the heat energy contained in the products can be advantageously utilized, for example, to preheat incoming reactants in conventional metallic heat exchangers.

Each fuel cell (26) contained in the fuel cell stack (16) is supplied with both a fuel gas, e.g., $H_2$, CO, $CH_4$, natural gas, etc., and an oxidant, e.g., air or oxygen, at temperatures of about 800° C. to 1,200° C. The oxidant electrochemically oxidizes the fuel through a series of electrochemical reactions in the fuel cell which produce direct current (DC) electrical energy, heat and water vapor (steam) as well as depleted (i.e., partially reacted) or spent fuel and spent oxidant as by products. Each fuel cell typically generates a rather small open circuit voltage of less than 1 volt, and accordingly, multiple fuel cells are electrically connected, at least in series, preferably in a series-parallel rectangular array, in order to generate a higher output voltage. For a detailed description of the materials and construction of an exemplary fuel cell, fuel cell generators, electrical interconnections and configurations thereof, reference can be made to U.S. Pat. Nos. 4,395,468 (Isenberg), 4,490,444 (Isenberg) and 4,751,152 (Zymboly), which are incorporated by reference herein in their entireties.

Oxidant (O) is fed through oxidant inlet port (38) through the feed conduits (56) inserted into the open ends (52) of the fuel cells to contact the inner air electrode (30), and a reformed fuel, being shown as (RF), such as hydrogen ($H_2$) and carbon monoxide (CO), is passed over the outside of the fuel cells to contact the exterior fuel electrode (28). At the fuel cell operating temperatures of about 600° C. to 1,200° C., more approximately 800° C. to 1,050° C., oxygen ions produced at the air electrode (30) and solid oxide electrolyte (32) interface pass through the electrolyte (32) to combine with the reformed fuel (RF) at the fuel electrode (28) and solid oxide electrolyte (32) interface. The reformed fuel (RF) is electrochemically oxidized releasing electrons which flow through an external load circuit to the air electrode to generate a flow of electrical current.

The electrochemical reaction of the oxidant (O) with the reformed fuel (RF) thus produces a potential difference across the external load circuit which maintains a continuous electron and oxygen ion flow in a closed circuit, whereby useful electrical power can be derived. The electrochemical reactions which occur in operation where the reformed fuel gas is either hydrogen gas or carbon monoxide gas can be shown as Equations (5), (6) and (7).

$$\text{Air Electrode}: O_2 + 4e^- \rightleftharpoons 2O^{2-} \quad (5)$$

$$\text{Fuel Electrode}: O^{2-} + H_2 \rightleftharpoons H_2O + 2e^- \quad (6)$$

$$O^{2-} + CO \rightleftharpoons CO_2 + 2e^- \quad (7)$$

Referring now to FIGS. 3–6, more particularly, an exemplary reformer-divider (60) with a gas diffusion barrier, as shown, is preferably a three-part configuration. The reformer-divider (60) comprises an inner board (62) which contains a hollow reforming channel (64) for reforming the reformable fuel mixture (RFM), a gas-tight barrier (76) generally surrounding the external walls (66) of the inner board for preventing unreformed fuel (F) leakage into the fuel cell stack prior to reforming, and an outer board (78) for housing the inner board-gas barrier subassembly. The inner reformer board (62) is provided with a hollow interior reforming cavity (64) containing reforming catalyst (80). The inner board (62) is also provided with an opened end or entrance (68) for the reformable fuel mixture (RFM) to be positioned near the closed ends (54) of the fuel cells (26) and a closed end (70) to be positioned near the opened ends (52) of the fuel cells (26). Positioned within the reformable fuel mixture entrance (68) are fuel riser tubes (72) which extend within the hollow cavity (64) to near the closed end (70) which allow the reformable fuel mixture (RFM) to pass inside the inner board (62) to near the closed end top (70) of the inner board near the opened ends of the fuel cells, then back down the inner board cavity (64) in contact with the internal walls of the inner board impregnated or coated with reforming catalyst (80), and then exits as reformed fuel (RF) to the fuel cells (26).

The inner board (62) is sheathed in a gas-tight barrier (76). The gas-tight barrier (76) can be made of nickel foil, INCONEL foil, or other suitable nickel based alloy foil and the like. The gas-tight barrier (76) essentially envelopes the inner board (62) except at the opened end entrance (68) for the reformable fuel mixture (RFM). The gas-tight barrier is used to block unreformed fuel gas leakage (F) passing down the interior of the inner board into the fuel cell stack. The gas-tight barrier (76) is also surrounded by an outer board (78) which envelopes the gas-tight barrier and reformer board subassembly, except at the opened end reformable fuel mixture entrance (68). Each reformer-divider (60) thus has an inner reformer (62) with an entrance (68) for a reformable hydrocarbon feed fuel mixture (RFM), for example, natural gas mixed with spent fuel, a reforming channel within the inner board containing reforming catalyst (80), a reformed fuel exit (88) to direct the reformed fuel (RF) to the fuel entry ports (50) to the fuel cells, a gas barrier means (76) and an external separator board (78) exposed to the fuel cells (26).

The inner reformer board (62) which acts as the reformer, can be made of porous alumina insulation board, preferably generally rectangular in shape, and of sufficient thickness to have a hollow channel formed within the board, preferably a rectangular channel, extending from an open end (68) of the board near the closed ends (54) of the fuel cells (26), along the axial length of the fuel cells, to a closed end (70) near the open ends (52) of the fuel cells (26). The interior cavity (64) of the inner board is preferably coated or impregnated with catalytic material (80) for reforming such as nickel or platinum, which provides the reforming surface for the hydrocarbon feed fuel reformable mixture. A more detailed description of catalytic reforming material and methods of impregnating catalytic material on alumina boards can be found in U.S. Pat. No. 4,898,792 (Singh, et al.), which is hereby incorporated by reference herein in its entirety.

The inner reformer board (62) is generally surrounded by a gas-tight barrier or sheath (76) which provides a gas diffusion barrier between the outer walls (66) of the inner board and the fuel cells (26) within the fuel cell stack (16). The gas-barrier (76) can be made of a metallic foil which is wrapped around the outer walls (66) of the inner reformer board (62) except at the open end (68) of the reforming cavity. The metallic foil can be nickel or INCONEL foil or the like. The metallic foil serves as the barrier to prevent any significant leakage through the inner board surfaces to the fuel cells.

The outer divider board (78) can also be made of porous alumina insulation board, preferably generally, rectangular in shape. The outer board (78) is approximately the width and height of the fuel cell stack and of sufficient thickness to have formed therein a hollow channel, preferably a rectangular channel, to house the inner board (62) and gas-barrier metallic foil (76) subassembly. The outer board (78) is supported below the fuel distribution board (40) beneath the fuel cell stack (16). The outer board preferably contains a hollow channel (90) for the inner board (62) and gas-barrier metallic foil (76) subassembly and with a sufficient clearance (92) to accommodate thermal expansion relative to the inner (62) and outer (78) alumina boards, thereby significantly reducing structural damage occurring to the boards as a result of thermal stresses occurring during generator and reformer operations. The gas-barrier metallic foil envelope (76) can thus locally deform to accommodate thermal expansion relative to the alumina boards. The outer board (78) also provides the balance of the required total wall thickness to give the correct heat transfer from the fuel cell stack (16) to the reforming channel (64) and to the reformable gas mixture (RFM), as well as providing electrical insulation between the separated fuel cells or cell bundles inside the fuel cell stack and metallic foil to prevent short-circuiting of the fuel cells and the generator.

The reformer-divider board (60) containing a gas-barrier layer, such as a metallic foil barrier, as a means to prevent gas leakage of the unreformed fuel mixture through the reformer-divider walls provides many advantages to the high temperature, solid oxide electrolyte fuel cell generators with an internal hydrocarbon fuel reformer located within the fuel cell stack between fuel cells or cell bundles. Heat transfer necessary for the endothermic reforming reaction is provided without the creation of excessive temperature gradients within the fuel cell stack and the reformer as compared to other internal hydrocarbon reformers not located within the fuel cell stack. Accordingly, it is not necessary to increase air flow to the fuel cells to prevent excessive temperature gradients, thereby desirably reducing pumping power requirements. This can also alleviate excessive thermal stresses on the reformer-divider, and improve its structural integrity during long term generator operations. In addition, unreformed gas leakage of the reformable gas mixture through the reformer-divider boards are significantly reduced, thereby preventing carbon or soot formation on the fuel cells and other generator components during long term generator operations. Reduction in soot formation prevents undesirable blocking of gas transport paths and prevents the creation of electrical short circuit paths. Furthermore, the reformer-divider board is provided with a much greater ability to withstand local temperature gradients along the face of the board and bowing of the board caused from thermal stresses arising from temperature gradients through the board from face to face.

The outer reformer-divider boards (78) used in, for example, a 100 kilowatt high temperature, solid oxide fuel cell generator are rectangular in shape with approximately the width and height of the fuel cell stack typically about 60 inches long and about 34 inches wide and about 1.75 inches thick. The inner reformer-divider boards (62) and the metallic foil gas barrier sheath (76) are provided in a slightly smaller overall width and height such that the inner board and gas barrier combination can be completely covered by the outer board. The inner board (62) is typically about 59 inches long and about 32 inches wide and about 1 inch thick, or segmented into several pieces with the same overall dimensions. The metallic foil (76) separating the inner board from the outer board is approximately 0.001-0.005 inch (1.0 mil. to 5.0 mil.) thick. The clearance (92) between the inner board-gas-barrier subassembly and the outer board is approximately 0.050 inch (50 mil.) thick. A rectangular hollow channel (64) forming a reforming channel extends from an open end (68) along the length of the inner board and terminates at a closed end (70) a distance along the internal length of the board away from the opposite end and is approximately slightly less than the length of the inner board. The hollow channel (64) is impregnated with a reforming catalyst material for reforming the unreformed hydrocarbon fuel by conventional techniques and provides the reforming surface for the fuel.

A variety of methods can be used to fabricate the reformer-divider board assemblies (60). In one example, the inner (62) and outer (78) reformer-divider boards are alumina insulation boards which are split along the length into halves, exposing the inner surface of the boards. A rectangular channel is machined into each half along the internal surface from one end to near the other end to form an interior channel (64) and (90) having an open end and a closed end, respectively. The inner board halves can be held together with INCONEL straps that are set into recesses machined along the width of the exterior surface of the inner board and welded in place. Since the metallic foil is used to contain the reformable gas mixture within the reforming channel, it is not necessary to have leak-tight joints between inner board halves. This can eliminate time consuming and unreliable cementing to provide leak tight seals for the inner board assembly. The metallic foil layer can be fabricated from nickel or INCONEL sheet which is folded around the inner board assembly and then welded along the side seams. The metallic foil can be reinforced at the weld line with two layers of nickel strips to provide adequate material for welding. The reinforcement can be spot welded to hold the pieces together during handling, and then TIG welded to provide a gas-tight seam. It is also possible that the seams can also be resistance, electron beam, or laser welded. The outer board assembly can be cemented together, or preferably held together with insulated or ceramic clips along the edges.

By way of example of operation of the reformer-divider (60) of the invention during generator (10) operation, a gaseous feed oxidant (O), such as air, is fed through oxidant feed inlet (38), and enters the oxidant feed conduits (56) at a temperature of about 500° C. to 700° C. and a pressure slightly above atmospheric. The oxidant feed (O) can optionally be heated by conventional means prior to penetrating the housing (12), such as by a heat exchanger coupled to a blower (not shown). The oxidant (O), within the conduits (56), is passed in heat transfer relation through the combustion chamber (18), where the oxidant (O) is further heated to a temperature of about 800° C. to 900° C. by the sensible heat released by the combusted exhaust gas (E). The oxidant (O) then flows through the length of the oxidant circuit, through the oxidant conduits which extend down the inside length of the fuel cells (26), being further heated to approximately 1,000° C., by virtue of absorbing most of the heat generated during the electrochemical reaction. A smaller fraction of the heat is absorbed by the fuel.

The oxidant (O) is then discharged into the closed ends (54) at the bottom of the fuel cells (26) to contact the inner air electrodes (30) along the active length of the fuel cells. The oxidant (O) released within the fuel cells (26) then reverses direction, and electrochemically reacts at the inner air electrode (30) along the inside active length of the fuel cells, being depleted in oxygen as it approaches the opened ends (52) of the fuel cells. The depleted or spent oxidant (SO) is then discharged into the combustion chamber (18) through the opened cell ends (52). The spent oxidant (SO) combusts with depleted or spent fuel (SF), where part of the total depleted fuel (SF) passes through porous barrier (42) to form hot combusted exhaust gas (E), which exits the generator through combusted exhaust gas exit channel (44). The combusted exhaust (E) gas can be directed to pass in heat transfer relation with other generator components (not shown), for example, the wall of the reforming chamber, prior to exiting the generator to provide an additional heat source.

In this invention, a gaseous hydrocarbon feed fuel (F) that has yet to be reformed, such as gaseous hydrocarbon, including methane, ethane, propane and the like, vaporized petroleum fractions such as naphtha, and alcohols such as ethyl alcohol, and preferably natural gas, that is, a mixture of approximately 85% methane, and 10% ethane with a balance of propane, butane and nitrogen, can be used. These reformable fuel mediums are fed into the fresh hydrocarbon feed fuel inlet (36) as unreformed feed fuel (F). The gaseous hydrocarbon feed fuel (F) is combined with water vapor and/or carbon dioxide to form a reformable fuel mixture (RFM) at the mixing chamber (48). In the generator, the water vapor and/or carbon dioxide can be supplied to the feed fuel gas from the spent fuel (SF). As shown, a major portion of the hot depleted or spent fuel (SF) formed along the axial length of the outer fuel electrode (28) is directed to a spent fuel gas recirculation channel (46). As mentioned above, the other portion of the spent fuel (SF) passes into the combustion chamber (18), to combust with spent oxidant, and to preheat the fresh oxidant feed (O). The spent fuel recirculation channel (46) passes from the generator chamber (16) to feed into and combine with the fresh hydrocarbon feed fuel (F) at a mixer (48) such as an ejector, jet pump, aspirator. This allows recirculation of a portion of the spent fuel containing at least water vapor and/or carbon dioxide, to provide the oxygen species required for reforming, and also if desired excess oxygen species for reforming without significant hydrocarbon cracking. The combined spent fuel and fresh hydrocarbon feed fuel provides a reformable fuel mixture (RFM) for reforming en route to the fuel cell stack (16) containing the fuel cells (26).

In this invention, the reformable fuel mixture (RFM) passes through reforming chambers (60) located inside the fuel cell stack between individual fuel cells (26) cell bundles (22, 24). During operation of the reformer-divider (60), when fuel riser tubes (72) are used, the reformable fuel mixture (RFM) passes from tube entrance through the inside of the riser tube, to the top of the riser tube where the reformable fuel mixture exits near the closed end (70) of the reformer-divider (60), reverses flow, and passes back down the interior channel (64) of the reformer-divider, while making contact with the internal walls of the inner board which are impregnated with reforming catalyst. The reformable fuel mixture is thereby reformed along the inside active length of the inner reformer boards. When a single partition (74) is used the reformable fuel mixture (RFM) passes from entrance, along one side of the partition, in the channel formed by the partition and divider walls, to the top of the partition, over the top of the partition, where the reformable fuel mixture reverses flow and passes back down the reformer-divider in the channel formed by the partition and other divider wall and is reformed.

The reformed fuel mixture after passing through the reforming material in the reformer-divider board (60) passes as reformed fuel (RF) through a series of ports (50) in the fuel distribution plenum (88) which connects the reformer-divider (60) to the generator chamber (16). The reformed fuel (RF) passes into the generator chamber and over the outer fuel electrodes (28) of the fuel cells. The reformed fuel (RF) released over the fuel electrodes (28) of the fuel cells (26) electrochemically reacts at the outer fuel electrode (28) along the outside active length to the fuel cells (26), being depleted in fuel as it approaches the porous barrier (42) and spent fuel recirculation channel (46). The depleted or spent fuel (SF) is then discharged into the combustion chamber (18) through the porous barrier (42) and also into the spent recirculation channel (46) as previously mentioned.

The overall electrochemical reactions of the generator operating at a temperature of about 800° C. to 1,200° C., typically 1,000° C. convert reformed fuel gas (RF), such as hydrogen ($H_2$) and carbon monoxide (CO) to direct current (DC) electricity, heat and water vapor. The oxidant (O) passing inside the fuel cell is electrochemically reduced at the air electrode-electrolyte interface. The electrons for the reduction of oxidant are supplied by the air electrode. The oxygen ions formed become part of the solid oxide electrolyte crystal structure and migrate through the electrolyte to the electrolyte-fuel electrode interface. Fuel passing over the outside of the fuel cells is electrochemically oxidized at the electrolyte-fuel electrode interface. The oxidized fuel released is carried away. The electrons released are directed to flow through an external circuit to the air electrode, thus generating a flow of DC electrical current. For, more complete description of electrochemical operations of a high temperature, solid oxide fuel cell generator, reference can be made to U.S. Pat. No. Re. 28,792 (Ruka), incorporated by reference herein in its entirety.

Figure 7:
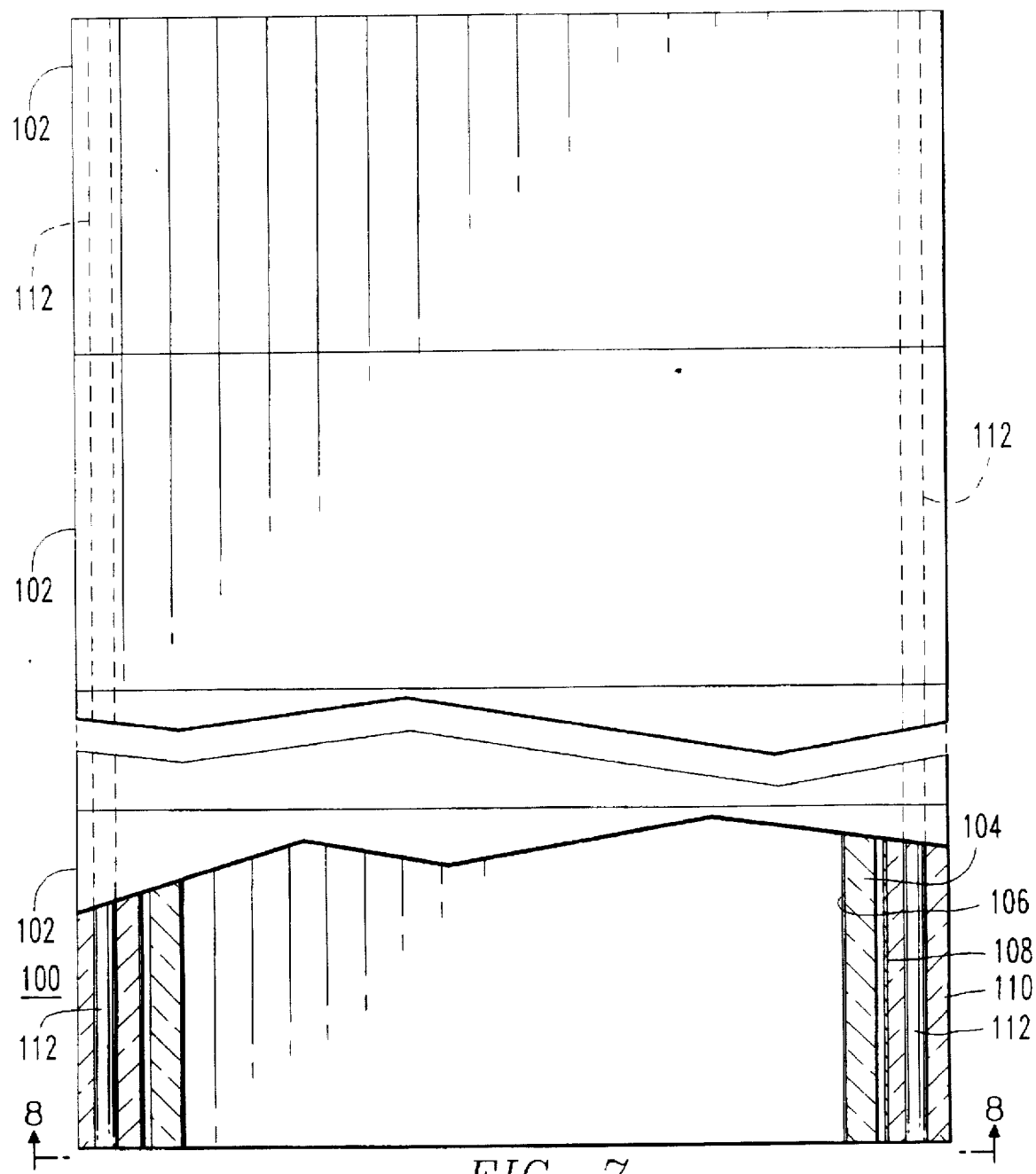
FIG. 7 is side view of an alternate embodiment of an internal reformer-divider board of the invention positionable within the fuel cell stack between fuel cells or cell bundles and having a gas barrier cutaway at a portion to show the multi-part configuration.
Figure 8:
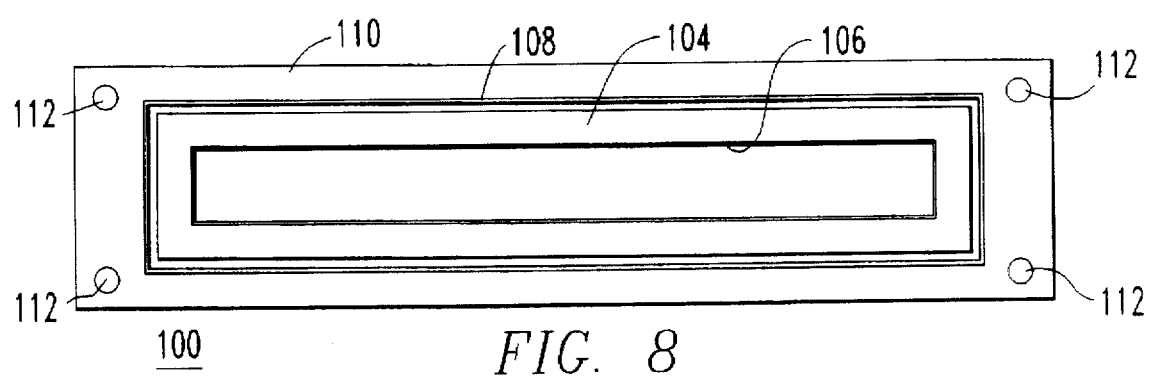
FIG. 8 is a bottom view of the reformer-divider board of FIG. 7 along line 8—8.

In a second embodiment of the invention as shown in FIGS. 7 and 8, the reformer-divider board (100) is provided as a plurality of axial segments (102) stacked on top of each other to form the reformer-divider of desired size. Each axial segment (102) is provided with a hollow inner board (104) impregnated with reforming catalyst (106), a gas-tight barrier (108), and a hollow outer board (110). The gas-tight barrier layer, e.g. metallic foil, by removing the leak tightness requirement from the alumina board assemblies, makes it possible to fabricate the board assemblies in several axial sections, if desired. This would then make it possible to machine the internal pockets of the inner and outer board with conventional tooling without splitting the boards into halves, thereby eliminating the need for holding the board halves together. These subsections (102) can be approximately 12 to 20 inches in height and approximately 24 inches in width, could then be stacked to give any height to the reformer-divider as required. The subsections could be held in place and in alignment with ceramic tie rods (112) through the length of the combined subsections at positions adjacent to the internal channel for reforming.

Figure 9:
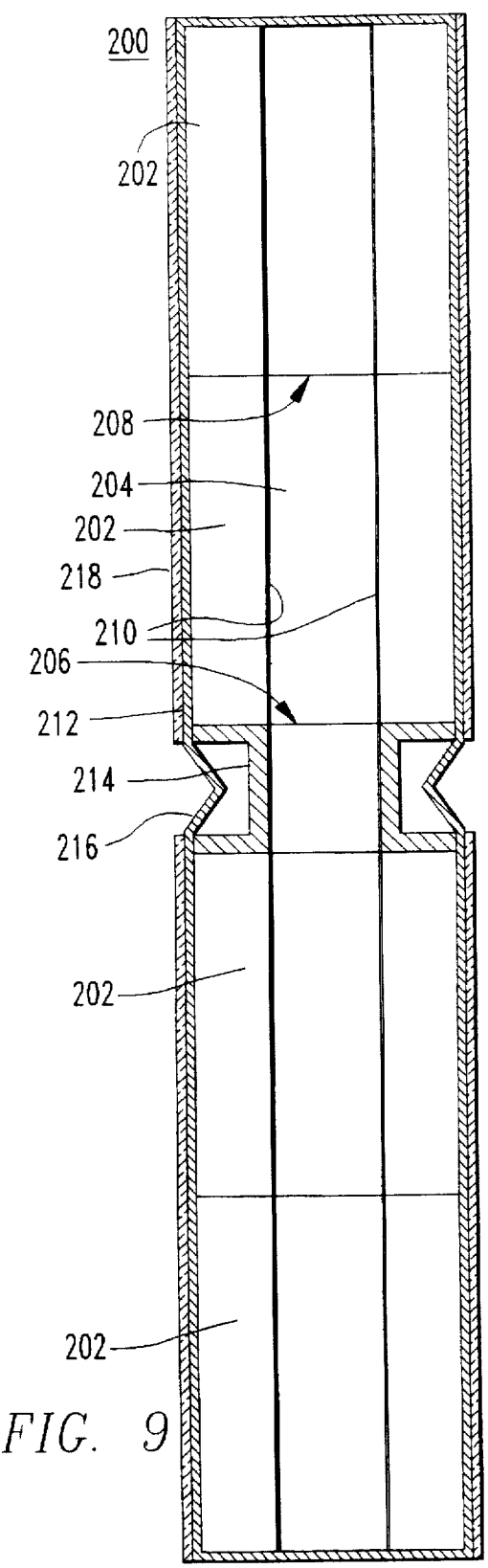
FIG. 9 is another alternative embodiment of an internal reformer-divider board of the invention positionable within the fuel cell stack between fuel cells or cell bundles and having a gas barrier; and, FIG. 10 is another alternative embodiment of an internal reformer-divider board of the invention positionable within the fuel cell stack between fuel cells or cell bundles and having a gas barrier.

In a third embodiment of the reformer-divider as shown in FIG. 9, an alternative gas barrier sheath arrangement is shown. In this embodiment, the reformer-divider board (200) is rectangular in shape and is axially segmented along its length into a plurality of subsections (202). Each subsection is hollowed (204) along the length of its interior surface having two open ends (206) and (208), thereby forming a rectangular tube. The hollowed area (204) is impregnated with reforming catalyst (210). A gas-barrier means (212) such as metallic sheath comprising two halves is provided to act as a gas leakage barrier. The metallic sheath (212) can be made of high temperature resistant metal. Into each half of the metallic sheath (212), the axially segmented subsections (202)of reformer-divider boards (200)are placed, stacked one on top of each other to obtain the desired height. An INCONEL separator (214) is provided into one of the half assemblies comprising the stacked reformer-divider and metallic sheath. The two half assemblies are connected with rectangular bellows (216). The bellows are located at the same elevation as the INCONEL separator (214) and serve to accommodate differential growth of the INCONEL envelope relative to the alumina insulation board. The bellows preferably will deflect into reliefs (not shown) machined into the separator. In addition, the bellows may provide a stiffening effect for the envelope at its midplane to aid in controlling possible thermal distortion. The outside of the metallic sheath is insulated with alumina paper (218) to avoid short circuiting of the fuel cell stack.

Figure 10:
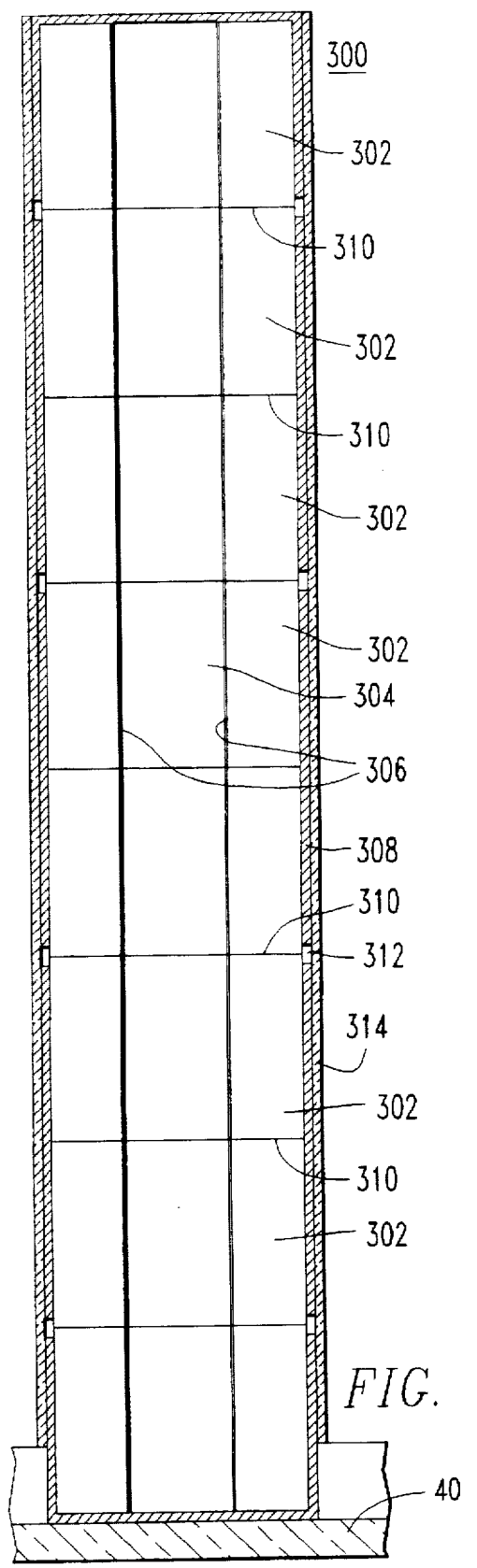

In a fourth embodiment of the reformer-divider as shown in FIG. 10, an alternative gas barrier arrangement is shown. In this embodiment, the reformer-divider board (300) is rectangular in shape and is axially segmented along its length into a plurality of subsections (302). Each subsection (302) is hollowed along the length of its interior surface to form a hollow channel (304). The hollow channel (304) is impregnated with reforming catalyst (306). The axial segments (302) are then stacked inside a gas-barrier means (308) such as a metallic sheath. The metallic sheath (308) can be made of high temperature resistant metal. If necessary, to stiffen the sides and reduce any buckling tendency, tie wires or rods (310) can be passed through the metallic envelope (308) and reformer-divider boards along its cross-sectional length and then welded to the outside face of the metallic envelope. If tie wires or rods (310) are used, the reformer-divider boards would be provided with slots (312) to allow for movement of the tie members due to relative thermal growth. When installed in the fuel cell stack of a generator, the growth of the envelope can be permitted at the bottom where the lower edge of the envelope could either grow into a crevice left between the fuel distribution board (40) and the reformer-divider assembly, or grow until the lower edge is flush with the top of the cell closed end positioning board. In either case, any fuel leakage to thermal expansion would be small and confined to the bottom of the fuel cell stack. The envelope can be insulated with alumina paper (314) or other insulation material such as sprayed ceramic to prevent short-circuiting of the fuel cell stack.

In both of the last two alternative embodiments, the problem of fuel leakage or diffusion through the porous alumina boards is significantly reduced, since the metallic sheath envelope will contain the fuel.

The invention will now further be clarified by a consideration of the following example, which is intended to be purely exemplary of the reformer-divider configuration and operation of the invention.

EXAMPLE

A reformer-divider board which will be used in a 100 kW SOFC generator was constructed in accordance with the reformer-divider design shown in FIGS. 1–6 for the purpose of evaluating mechanical integrity, reforming capability, and ease of manufacture. As such, the reformer-divider board was comprised of an inner board assembly made from machined alumina board material, a nickel foil liner of about 0.005 inch thickness which was placed around the finished inner board assembly, and an outer board assembly from machined alumina board material which was placed around the inner board and metallic foil subassembly. The inner board was machined to form the gas pocket, although this pocket could be formed by other means, such as by attaching strips of material to the edges of a flat sheet. The catalyst was loaded into the inner board assembly by soaking the boards in catalyst bearing solution. The foil liner was formed around a mandrel, and the seams were resistance welded to form a gas tight seal. Subsequent pre-test leak checks at ten times the expected operating pressure showed that there were no leaks at the seams. The outer board assembly was machined in two pieces and assembled over the inner board assembly.

The assembled reformer-divider board was placed in a reformer-divider board test rig which simulated the fuel cell stack environment. Methane rich fuel was supplied to the board over an extended period of time (1,500 hours) and periodic measurements of exit fuel gas composition were taken. Fuel flowrates were varied to represent the operating points expected for a 100 kW generator.

The tests revealed that the overall reforming percentage was acceptable and superior to that achieved with present external reformers used in smaller generator designs. Reforming percentages varied from about 85% to 98% with higher percentage occurring for the low flow cases (minimum power simulation). Visual post test inspection revealed no oxide or corrosion on the surface of the foil liner and no apparent mechanical creep. The foil liner was checked following the test and found to still remain leak tight. Material samples were taken and analyzed to examine the microstructure of the foil. Based on the results obtained, the reformer-divider design is targeted for application in the SOFC generators of the present and future.

This invention disclosure incorporates by reference herein all of the hereinabove mentioned U.S. patents in their entireties.

The invention having been disclosed in connection with the foregoing embodiments and examples, additional variations will now be apparent to persons skilled in the art. The invention is not intended to be limited to the embodiments and examples specifically mentioned, and accordingly reference should be made to the appended claims rather than the foregoing discussion, to assess the spirit and scope of the invention in which exclusive rights are claimed.

We claim:

1. An electrochemical fuel cell generator configuration, which comprises: a plurality of electrically connected, axially elongated, electrochemical fuel cells, each fuel cell having an outer electrode, an inner electrode, and a solid oxide electrolyte positioned between the electrodes, in which axially elongated dividers are positioned between and separate the fuel cells, and further in which a least one of the axially elongated dividers is hollow in a portion along the length having an open end and a closed end within solid elongated walls, the hollow portion containing a catalytic reforming material, a reformable fuel mixture inlet channel, a reformed fuel exit channel to the fuel cells, and the hollow divider further containing a means effective to prevent reformable fuel mixture gas leakage from the divider to the fuel cells, in which the means to prevent gas leakage comprises the solid elongated walls of the hollow divider being surrounded by a metallic foil layer, except at the reformable fuel mixture inlet, forming a hollow divider-metallic foil subassembly.

2. The configuration of claim 1, in which the hollow divider-metallic foil subassembly being further surrounded with a space therebetween by an axially elongated housing, in which the housing is hollow along the length having an open end and a closed end within solid elongated walls, the hollow portion containing the hollow divider-metallic foil subassembly forming a hollow divider-metallic foil-hollow housing assembly.

3. The configuration of claim 2, in which the fuel cells are tubular having a closed end and an open end, the hollow divider having a closed end near the open end of the fuel cells and an open end near the closed end of the fuel cells, the reformable fuel mixture entrance passing into the open end of the hollow divider near the closed end of the fuel cells, the reformable fuel mixture entrance connecting a reformable fuel mixture channel within the generator to at least one reformable fuel mixture channel within the hollow divider and a return channel having a reformed fuel exit to the fuel cells.

4. The configuration of claim 2, in which the hollow dividers and hollow housings are made of porous alumina boards.

5. The configuration of claim 2, in which the metallic foil comprises nickel foil.

6. The configuration of claim 2, in which the catalytic reforming material comprises at least one of platinum or nickel.

7. The configuration of claim 6, in which the catalytic reforming material is on the inside or within the hollow divider walls.

8. The configuration of claim 2, in which the reformable fuel mixture inlet channel is formed by an elongated partition positioned within the hollow divider.

9. The configuration of claim 2, in which the reformable fuel mixture inlet channel is formed by at least one hollow tube positioned within the hollow divider.

10. The configuration of claim 2, in which the hollow divider comprises a plurality of axial segments, each axial segment being hollow along the length having opened ends within solid elongated walls, the hollow portion containing a catalytic reforming material, each axial segment being axially positioned on top of each other and terminating in a top most axial segment being hollow in a portion along the length having an open end and a top closed end within solid elongated walls, the hollow portions thereof containing a catalytic reforming material, the bottom most axial segment containing a reformable fuel mixture inlet channel extending the length of the hollow portions of the axial segments and a reformed fuel exit channel to the fuel cells, each of the axial segments further comprising axially segmented metallic foil layers and hollow housings.

11. The configuration of claim 1, in which the means to prevent gas leakage comprises solid elongated walls of the hollow divider being axially segmented into subsections and positioned one on top of each other into a hollow metallic envelope having elongated solid walls, in which the hollow metallic envelope is insulated with insulation material along its elongated solid walls.

12. The configuration of claim 11, in which the hollow metallic envelope is axially segmented into at least two axially metallic envelope portions, an upper envelope portion and a lower envelope portion, the lower envelope having two open ends and the upper envelope having an open end and a top closed end, and further in which an open end of the lower envelope is connected to the open end of the upper envelope by metallic axial separators and bellows, and further in which the metallic envelope is insulated with insulation material.

13. The configuration of claim 11, in which the insulation material comprises at least one of alumina paper and sprayed ceramic.

14. The configuration of claim 11, in which the axially segmented hollow dividers are held together by tie rods.

15. A high temperature, solid oxide fuel cell generator configuration, which comprises: a housing containing an axially elongated generator chamber containing one or more fuel cell bundles, each cell bundle being electrically connected and containing a plurality of electrically connected parallel, axially elongated fuel cells, each cell having an exterior fuel electrode, an interior air electrode, and solid oxide electrolyte sandwiched between the two electrodes, a fresh gaseous feed oxidant inlet to the interior air electrode, a fresh gaseous hydrocarbon feed fuel inlet to the fuel electrodes, a combustion chamber connected from the generator chamber which combusts a spent gaseous fuel with a spent gaseous oxidant, at least one combusted exhaust gas channel connected from the combustion chamber to the atmosphere, at least one spent gas recirculation channel connected from the generator chamber to a mixing chamber which combines fresh gaseous hydrocarbon feed fuel from the fresh gaseous hydrocarbon feed fuel inlet with spent gas to form a reformable fuel mixture, in which a reformable fuel mixture channel connects from the mixing chamber and passes through the axial length of the generator chamber to a reformable fuel mixture inlet channel into at least one axially elongated divider positioned between and separating the fuel cells, in which the at least one axially elongated divider is hollow in a portion along the length having an open end and a closed end within solid elongated walls, the hollow portion containing a catalytic reforming material, a reformed fuel exit channel to the fuel cells, and the hollow divider further being surrounded by a metallic foil layer, except at the reformable fuel mixture inlet channel and further being spaced apart a distance and surrounded by an axially elongated housing, in which the housing is hollow along the length having an open end and a closed end within solid elongated walls, the hollow housing containing the hollow divider and metallic foil.

16. The configuration of claim 15, in which the fuel cells comprise an air electrode which comprises doped lanthanum manganite, a solid oxide electrolyte which comprises yttria doped zirconia or scandia doped zirconia, and a fuel electrode which comprises nickel-zirconia cermet.

17. The configuration of claim 16 in which the metallic foil layer comprises nickel foil, the hollow divider and hollow housing both comprise porous alumina board, and the reforming catalyst is impregnated on the walls of the hollow channel of the hollow divider.

* * * * *